Apr. 3, 1923.

H. T. THOMAS.
PANEL ADJUSTMENT FOR INCLOSED MOTOR VEHICLES.
FILED FEB. 25, 1921.

INVENTOR
HORACE T. THOMAS
BY
ATTORNEY
Ralzemond A. Parker

Apr. 3, 1923.

H. T. THOMAS.

PANEL ADJUSTMENT FOR INCLOSED MOTOR VEHICLES.

FILED FEB. 25, 1921.

INVENTOR
HORACE T. THOMAS

BY ATTORNEY
Ralzemond A. Parker

Patented Apr. 3, 1923.

1,450,394

UNITED STATES PATENT OFFICE.

HORACE T. THOMAS, OF LANSING, MICHIGAN.

PANEL ADJUSTMENT FOR INCLOSED MOTOR VEHICLES.

Application filed February 25, 1921. Serial No. 447,812.

*To all whom it may concern:*

Be it known that I, HORACE T. THOMAS, citizen of the United States, residing at Lansing, county of Ingham, State of Michigan, have invented a certain new and useful Improvement in Panel Adjustments for Inclosed Motor Vehicles, and declare the following to be a full, clear, and exact description of the same, such as will enable others skilled in the art to which it pertains to make and use the same, reference being had to the accompanying drawings, which form a part of this specification.

My invention relates to panel adjustments for inclosed motor vehicles and contemplates an interchangeable screen and panel.

$a$ indicates the side board of the box and $a^2$ the flare board extending upward and outward from the upper edges of the side board $a$.

Figure 8:
Fig. 8 is a section on the line 8—8, Fig. 3.

$b$ is a continuous surface panel having broad engaging tongues $b^2$ $b^2$ at its upper edges which engage within the side rails of the top. These tongues are formed by sheets of metal riveted to the panel along its upper edge as shown in Fig. 8.

Figure 7:
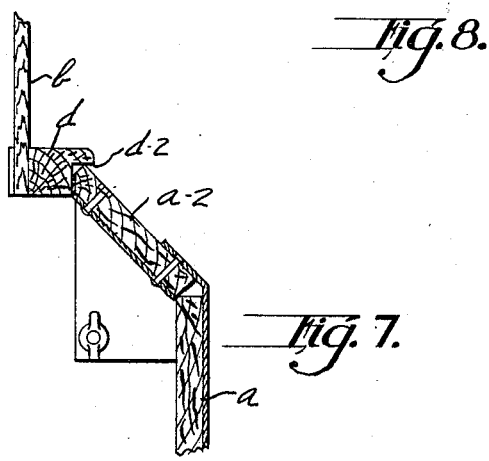
Fig. 7 is a section on the line 7—7, Fig. 1.
Figure 9:
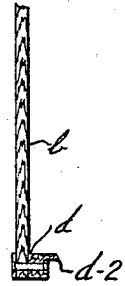
Fig. 9 is a section on the line 9—9, Fig. 3.

There is a rail $d$ (Fig. 7) along the lower edge of the panel $b$ and having a projecting tongue or offset $d^2$ along its upper and inner edge adapted to engage over the upper edge of the flare board $a^2$, as shown in Fig. 7, thus preventing water or other matter from falling and lodging in the space between the rail $d$ and the flare-board $a^2$.

Figure 10:
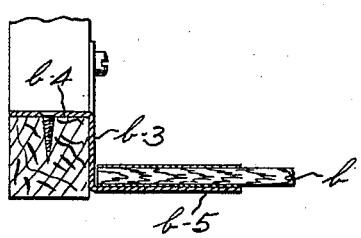
Fig. 10 is a section on the line 10—10, Fig. 3.

$b^5$ is a sheet of metal extending along the end edge of the panel $b$ at its lower portion, being bent in as shown at $b^3$ (Fig. 10) and then bent again to form the flange $b^4$ which is bolted or otherwise secured to the upright or standard of a vehicle by screws as shown in Fig. 10. The part $b^3$ forms a shoulder abutting against the supporting post.

$e$ is the wire screen adapted to be inserted in place instead of the panel $b$. There is a wooden strip $f$ extending along one of its end edges and a U shaped iron $g$, $g^2$, $g^3$ having its loop $g^3$ passing around the outer surface of the post $f$ and its wings $g$, $g^2$ extending parallel to each other so as to form a trough or groove between them and outside of said wooden strip. The wires $h$ having heads $h^2$ at their ends are inserted in the trough or groove formed between the parallel flanges $g$ and $g^2$ and then the space between said flanges is filled with cement which, when hardened, firmly fastens the ends of the wires $h$ in place in the groove.

Figure 1:
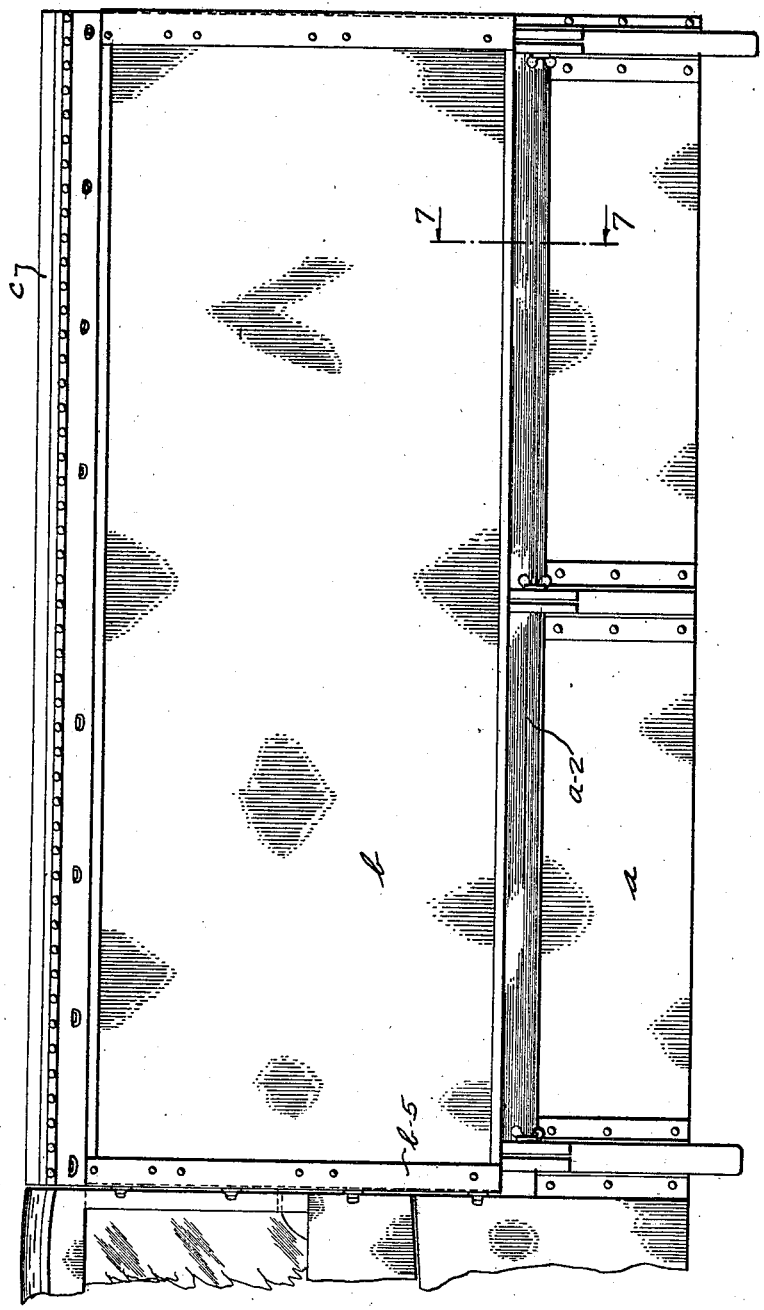
Figure 1 is an elevation of a portion of the side of an inclosed commercial vehicle with a panel attached thereto according to my invention.
Figure 2:
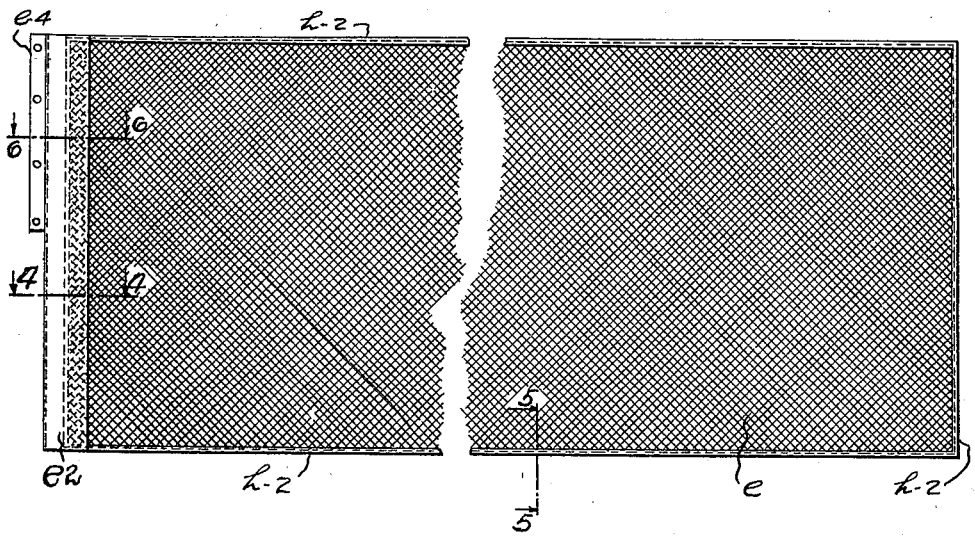
Fig. 2 is an elevation of the wire screen which may replace the panel.
Figure 3:
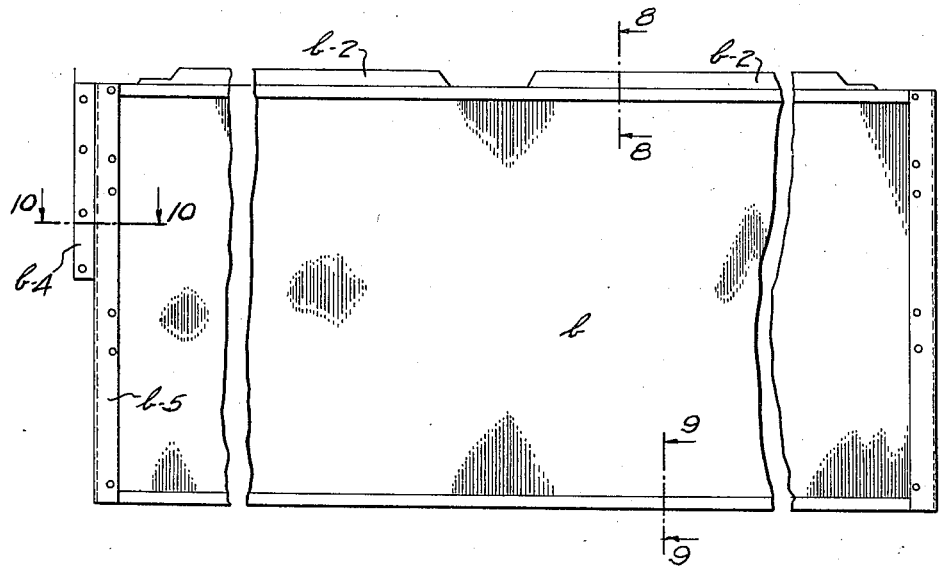
Fig. 3 is a similar elevation of the panel.
Figure 4:
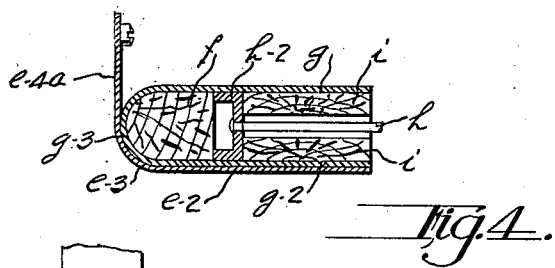
Fig. 4 is a section on the line 4—4, Fig. 2.
Figure 5:
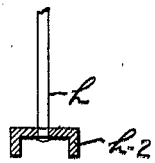
Fig. 5 is a detailed view on the line 5—5 of Fig. 2 illustrating the mode of connecting the wires of the screen into the frame of the same.
Figure 6:
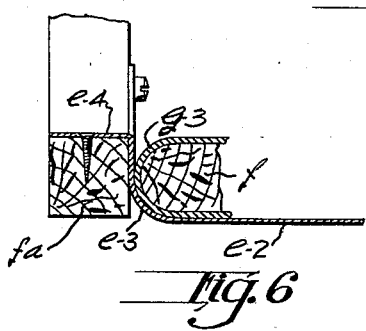
Fig. 6 is a section on the line 6—6, Fig. 2.

$e^2$ is a strip of sheet metal passing along the end edge of the screen panel $e$ turned inward at $e^3$ to fit the curved outer surface of the post $f$. At the upper portion of the strip $e^2$ the inturned edge $e^3$ is again turned outward as shown at $e^4$ (Fig. 6) to be secured to the inner surface of the wooden post $fa$. The lower portion of the strip $e^2$ is also turned inward at $e^3$ to fit snugly around the curved surface of the standard and is then continued inward in a strip $e^4a$ and is bolted to a flat transverse surface upon the automobile as shown in Fig. 4.

The strip $d$ with the shoulder $d^2$ extends over the upper edge of the flare-board $a^2$ and supports the panel while excluding water from the interstices. A fall may be provided to cover the joint between the panel and top.

Claims:

1. A panel having a strip of metal extending along its vertical edge, one-half of said strip being bent inward and secured and the other half being bent inward and then outward at right angles, the latter part being secured in place.

2. A panel board having a strip extending along its vertical edge, said strip being in part bent around the edge inward and then again at right angles and secured at the last named portion to a stationary support, said strip being in part bent inward to form a transversely extending flange, said flange being secured to a stationary support.

In testimony whereof I sign this specification.

HORACE T. THOMAS.